(12) United States Patent
Dieberger (10) Patent No.: US 6,920,452 B2
(45) Date of Patent: Jul. 19, 2005

(54) SOUND PATTERN FEEDBACK FOR INFORMATIONAL EVENTS DURING TYPING

(75) Inventor: Andreas Dieberger, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 09/844,916

(22) Filed: Apr. 26, 2001

(65) Prior Publication Data

US 2002/0161759 A1 Oct. 31, 2002

(51) Int. Cl.[7] ............................................. G06F 17/30
(52) U.S. Cl. ......................... 707/6; 707/3; 704/254; 704/252; 704/235; 704/231
(58) Field of Search ............................ 715/533; 400/63, 400/68, 48, 697, 7, 705.1, 83; 707/6, 3, 4, 101, 100; 704/249, 254, 231, 252, 260, 235, 234

(56) References Cited

U.S. PATENT DOCUMENTS

| | | | |
|---|---|---|---|
| 4,689,768 A | 8/1987 | Heard et al. ................. 364/900 |
| 4,807,181 A | 2/1989 | Duncan, IV et al. ........ 364/900 |
| 4,829,472 A | 5/1989 | McCourt et al. ............ 364/900 |
| 4,830,521 A | 5/1989 | Sakai et al. ................... 400/63 |
| 4,887,920 A | * 12/1989 | McRae et al. ................ 400/63 |
| 4,913,566 A | 4/1990 | Sakai et al. ................... 400/63 |
| 4,923,314 A | 5/1990 | Blanchard, Jr. et al. ...... 400/63 |
| 5,112,148 A | * 5/1992 | Tanaka et al. ................ 400/63 |
| 5,189,610 A | 2/1993 | Kaplan et al. ............. 364/419 |
| 5,812,863 A | * 9/1998 | Ishikawa ..................... 715/533 |
| 6,434,547 B1 | * 8/2002 | Mishelevich et al. .......... 707/3 |
| 6,490,563 B2 | * 12/2002 | Hon et al. .................. 704/260 |

* cited by examiner

Primary Examiner—Jean M. Corrielus
(74) Attorney, Agent, or Firm—Randy W. Lacasse; Lacasse & Associates, LLC; Jaclyn A. Schade (57) ABSTRACT

A word processing program uses a number of low-key alarm signals or sound patterns to communicate a variety of situations that arise during data input by a user. A personalized program is used to detect incorrectly formatted or improperly inputted data such as e-mail addresses, phone numbers, template or form entries as well as to recognize stored data, such as a user's complete mailing address or programming codes. When alerted, the user accepts, denies or ignores any given suggestion the program provides. The sound patterns are specific to different types of events and may also indicate the severity of the event. A user also has the option of allowing the software to automatically correct any of the situations to prevent stalling of the input process.

22 Claims, 7 Drawing Sheets

SOUND PATTERN FEEDBACK FOR INFORMATIONAL EVENTS DURING TYPING

BACKGROUND OF THE INVENTION

1. Field of Invention

The present invention relates generally to the field of word processing. More specifically, the present invention is related to a computer-based word processing program used to aid in the correction of typographical and formatting errors.

2. Discussion of Prior Art

Computer-based word processing programs, such as spell check and online thesauruses, are widely used to assist in the correction of incorrectly inputted data When implemented, these programs also offer solutions to replace found errors, or allow the user to add new words to the program's memory.

The use of audible signals or alarms is also implemented in several of these programs. As a user types words or similar data, the program refers back to the dictionary as stored in the memory to assure proper spelling. Should the program not find a word similar in spelling, an alarm will be activated to alert the user of the error. The user can then take the necessary steps to correct the misspelling. Examples of prior art systems using this technology or variations thereof are described below.

U.S. Pat. No. 4,689,768 discusses the use of a spelling verification system on a typewriter with an alarm that alerts the operator of inputted words that do not match any of those stored in the dictionary's memory.

U.S. Pat. No. 4,807,181 describes an electronic typewriter having a memory containing a spell-checking dictionary and a multi-character display. If the user enters characters not recognized by the memory, the user is alerted by an audible alarm and given on the display a successive amount of words that appear to be similar in spelling for use or for addition into the dictionary's memory.

U.S. Pat. No. 4,829,472 provides a spelling check module to be used in conjunction with a typewriter or personal computer that alerts the user by way of an audible beep of a misspelled word. The spelling check module is connected to the keyboard and data processor to receive the correct input. The module also includes a personal dictionary to which words can be added by the user for customization.

U.S. Pat. No. 4,830,521 discusses an electronic typewriter or word processor with a spelling check function and proper noun recognition, and an alarm means used for issuing an alarm when an input word is determined to be incorrectly spelled or not a proper noun.

U.S. Pat. No. 4,913,566 describes a typing device with a spelling check function that retrieves relational word data in a dictionary memory and displays a detection of any misspelled words while in the print mode. When a word is found that does not match any of those located in the memory, an alarm is sound to alert the user.

U.S. Pat. No. 4,923,314 presents a thesaurus feature for electronic typewriters in which words are identified in the dictionary feature in the typewriter memory, and the data base is scanned to display found synonyms and misspellings. If a possible error is found, an alarm alerts the user of a misspelled word.

U.S. Pat. No. 5,112,148 provides an electronic typewriter with a word processing system that checks the spelling of each word with the stored memory and alerts the operator of a misspelling by activating an audible alarm.

U.S. Pat. No. 5,189,610 discusses the use of an electronic dictionary on a typewriter or personal computer that is fully customizable to a specific application. If an error is found when comparing the input to the dictionary memory in the spelling check module, an audible indication of two beeps is activated to alert the operator that a word is misspelled.

Whatever the precise merits, features and advantages of the above cited references, none of them achieve or fulfills the purposes of the present invention. Previous computer-based word processing programs appear limited to single occurrence checking of spelling. Although spelling and thesaurus checking are important, formatting rules are also vital in the inputting process Forms, templates and documents such as those for billing can easily be entered incorrectly, even though the user's information never changes. Simple formatting mistakes, such as incorrect e-mail or World Wide Web addresses or errors made when writing programs can also be hard to find (such as leaving a simple parenthesis out). What is needed is a system that intelligently detects and selectively notifies the user of formatting errors existing over one or more entries.

SUMMARY OF THE INVENTION

The word processing program of the present invention is capable of performing several different functions while alerting the user by audible patterns of possible errors and appropriate changes. Errors are determined by intelligent monitoring of structured data input. By using a patterned sound indicator, the user knows immediately when a fault during the input process has been made. Once warned, the user has three options: (1) taking the program's suggestion and allowing the program to automatically fix the error, (2) manually correcting the mistake that was found, or (3) ignoring the mistake.

The invention is embodied in many implementations to not only aid the user in simplifying the input process, but also to warn the user of any mistakes that may have been made, as well as a solution for them. Those described herein include, but are not limited to, punctuation correction, data entry formatting analysis, comparing to stored personal information, spell checking, and quick entry/correction of programming languages. In one embodiment, personal information for the user is pre-stored, providing less time when supplying, for example, addresses and phone numbers, to forms and documents. Additionally, providing sound feedback can be particularly useful for disabled persons for increasing the speed and accuracy of data input.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will recognize additional embodiments using the patterned sound indicator and a computer-based monitoring of quick entry and formatting errors without departing from the scope of the present invention.

Figure 1:
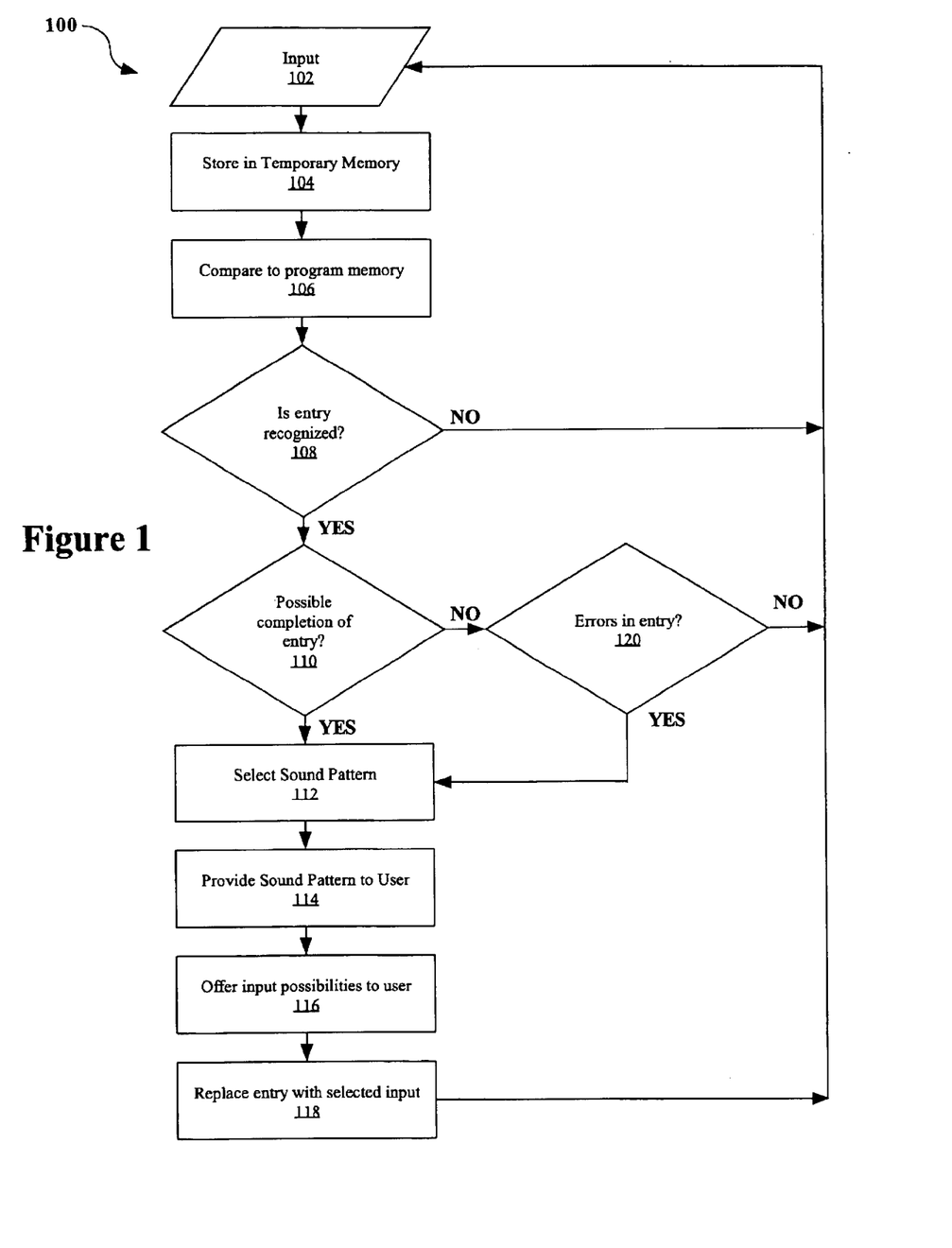
FIG. 1 illustrates a general overview of the program process.

FIG. 1 illustrates a general overview of the word processing program process 100. Input 102 is received and stored in a temporary memory 104 of a computer. Typically inputs are typed characters from a keyboard, but other computer-based inputs may be substituted without departing from the scope of the present invention. The program then compares the temporarily stored input 104 to that of program memory 106 (data stored locally or remotely—e.g. the web). If the entry is recognized 108, it is then determined whether the entry is complete 110. If the entry is found to be recognized, such as recognizing a user's pre-stored complete personal address or Social Security number, a sound pattern is selected 112. This sound pattern is provided to the user 114 to alert of the correlation, and the recognized information can be suggested to the user as possible input 116. The user may then opt to take the suggestion and replace the entry with the program's selected input 118, and continue working without further distraction. In an alternative embodiment (not shown), the user is given a suggestive feedback option (such as a date entry) to assist in manual correction entry even when the entry is not recognized. Alternately, the user may opt to ignore the sound pattern entirely based on the level of severity indicated by the sound pattern. Different sound patterns are thus intended to elicit differing levels of awareness and action by the user.

The sound patterns that are selected by the program are specifically low-key sounds that are used to indicate to the user a particular correlation found or an event that has occurred. A different sound pattern is applied to each recognized reading, so that the user can identify and associatively recognize the correlation or correction made by the sound pattern that is relayed by the system, allowing the user to have the option of disrupting workflow or continue working.

The low-key sounds that are used as a sound pattern indicator are preferably "earcons", or abstract sounds that do not have a real world equivalent, e.g. a three tone chord in a major key. An earcon sound is assigned for positive feedback and an additional sound for negative feedback, both of which have slight variations to indicate, for example, the severity of a pattern found. The slight variation in tone allows the user to identify a problem by the sound that is selected. The user, therefore, when in an ideal, noiseless environment, interprets the severity of the pattern by recognizing the tonal version of the earcon that is provided.

If the entry is recognized by the program 108, but it does not appear to be complete 110, the input is then checked for possible errors 120. If errors appear to be present, the program then follows a similar process of selecting a sound pattern 112, providing the selected sound pattern to the user 114, and offering a more suitable, preferably correct, input possibility, which the user may accept or deny 118. Errors, in this invention, typically involve single word formatting or analysis using rule based systems for a small number of words. Such rule systems include, but are not limited to, those capable of detecting formatting errors or improper use of a template entry area. In the preferred embodiment, errors should be detected substantially simultaneously with the occurrence, so as not to be intrusive to the typist. In most cases, if immediate feedback cannot be given, it is better to not provide feedback rather than presenting it too late. The specific rule based systems and associated methods are well known in the art and have not been included with this detailed description. Any word processing rules based system can be used within the system of the present invention without departing from the scope thereof.

Again, if errors appear to be present, a sound pattern is immediately generated, allowing the user to fix the problem or identified relation as it happens. For example, should the user tab out of a field without correctly entering data (as further discussed below), sound feedback occurs right away before the user begins typing in another field. In word processing programs, sound feedback occurs before a new word (or words) is typed. The rapid response of the sound feedback to the entered information allows the user to continue working without constant interruption of workflow.

Otherwise, if the entry is not recognized by the program, the program continues to compare the input information until a pattern is found. However, if the user proceeds to the next field in a form or to the next word or sentence, the search for a match is abandoned.

Figure 2:
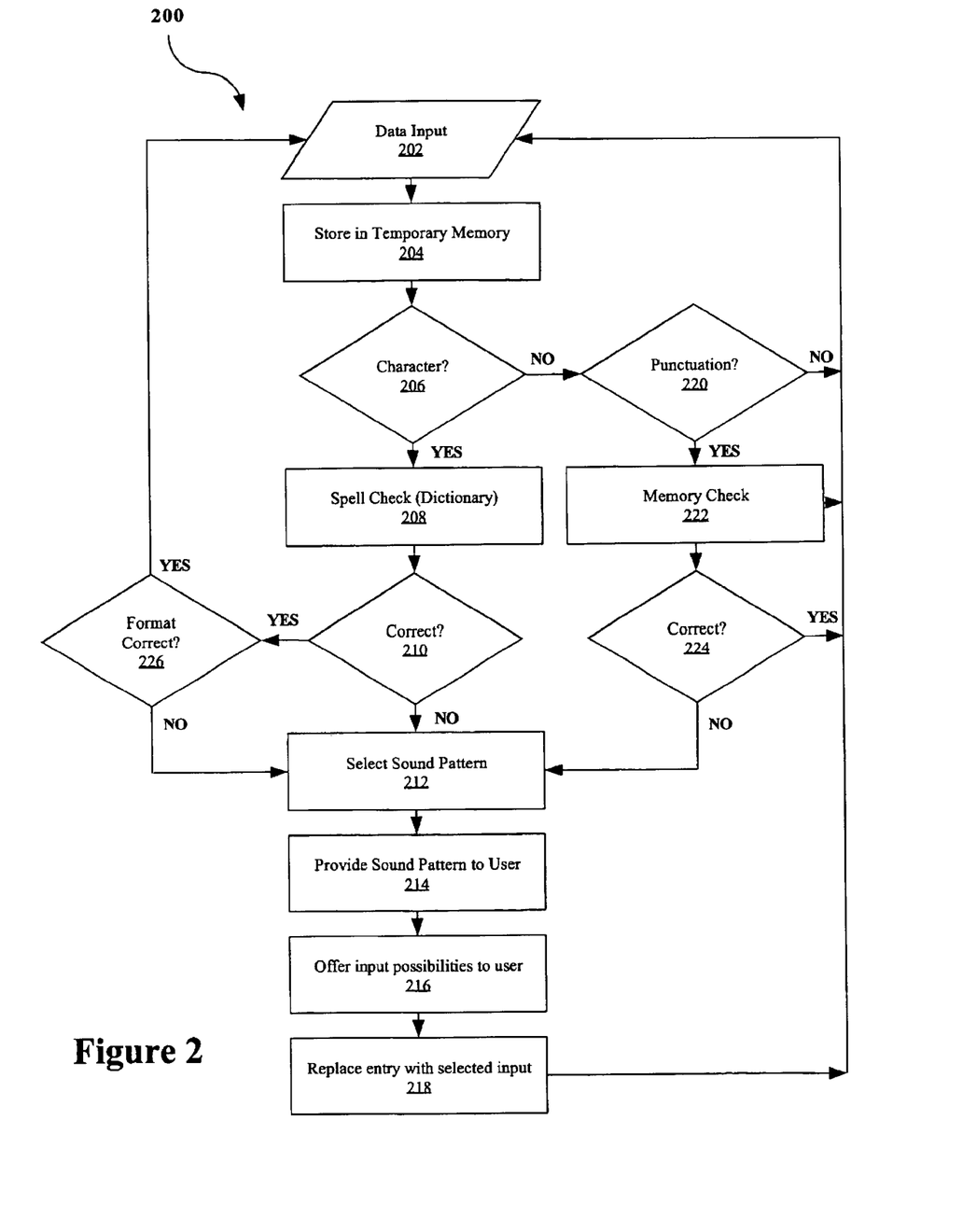
FIG. 2 illustrates a detailed flow diagram of the spelling, grammatical, and tense checking processes.

FIG. 2 illustrates a flow chart 200 detecting spell check, punctuation and format checking functions. Data is entered 202 by the user (e.g., typed on keyboard). The inputted information is then stored into temporary memory 204. The program analyzes whether input data 202 is a character 206. If yes, the input is sent directly to the spell-checking dictionary 208. A memory check is performed to find a proper spelling 210, and, if the spelling of the input 202 is found not to be correct (i.e., misspelled word) the program then follows a similar process of selecting a sound pattern 212, providing the selected sound pattern to the user 214, and offering a more suitable input possibility 216, which the user may explicitly accept, manually replace, or ignore. If accepted, the program replaces the error with the found solution 218.

Should the spelling of the input appear correct, the program analyzes the format (e.g., e-mail, date, number of characters, driver's license) 226 of the input. The format 226 determines, for example, if the expected format for a specific entry on a form/template is used. If not, the program then follows a similar process of selecting a sound pattern 212, providing the selected sound pattern to the user 214, and offering a more suitable input possibility 216, which the user may accept or deny. In the form/template example, the sound is preferably made before or immediately after the user completes an entry, so as to allow correction without having to place the cursor back into the entry area.

If the inputted key is not a character (from step 206), the program checks to see if the data input 202 is a mark of punctuation 220. If yes, a memory check 222 is performed and correct use of the input is analyzed 224. If the program detects that the input is used incorrectly or a better key can be utilized, the above steps 212–218 are repeated.

Figure 3:
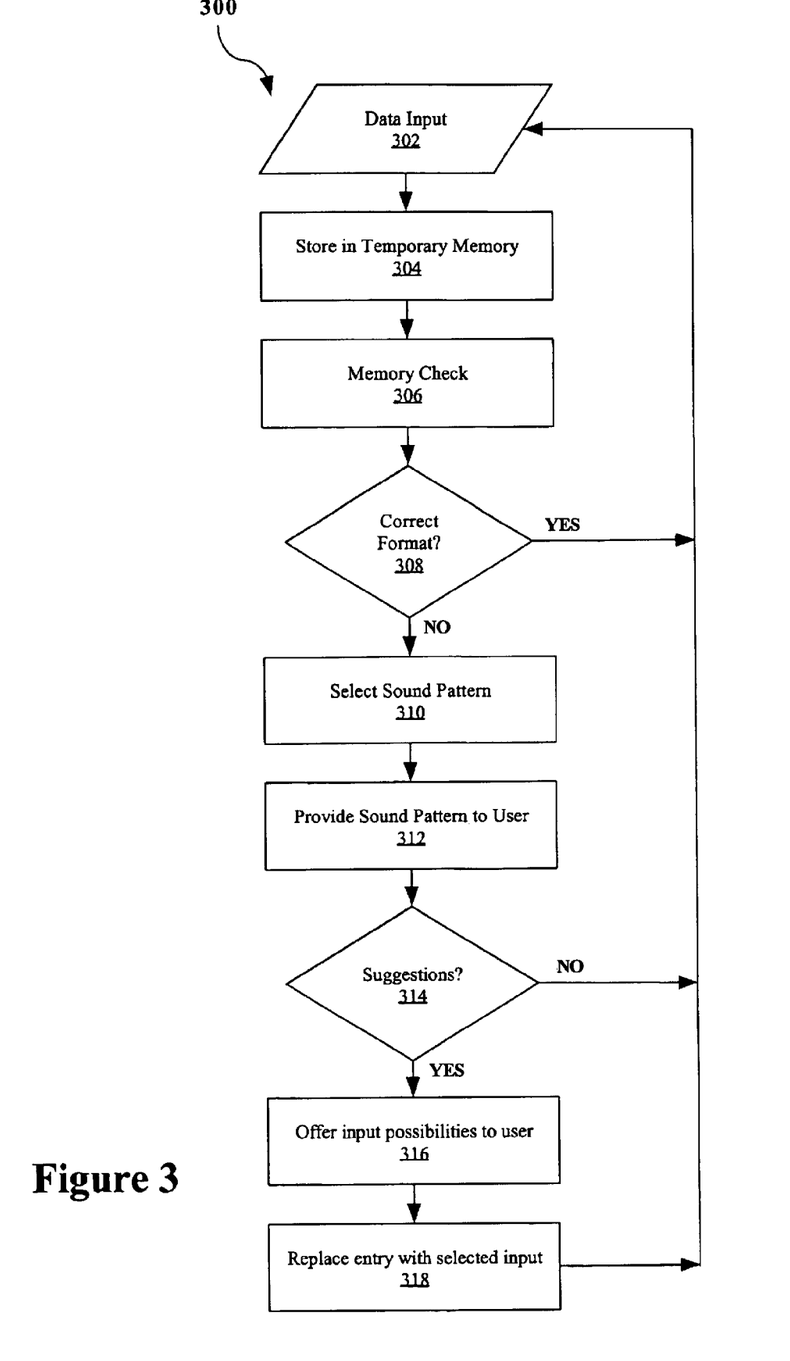
FIG. 3 illustrates a detailed flow diagram of the data entry format process.

FIG. 3 illustrates a more specific embodiment of the above process, the process 300 analyzing specific data that is entered. This data can include information such as phone numbers, e-mail addresses, URLs, website addresses, et al. If the data input 302 is incorrectly formatted 308, for instance, if a key character is omitted, or if the data that is entered and stored in the temporary memory 304 does not match the format of the given field as found in the program memory 306, the program follows a process of selecting an appropriate sound pattern 310, providing the selected sound pattern to the user 312, and giving suggestions 314. Should the user wish to accept the possible suggestion, the program will offer a more suitable input possibility 316. The user may explicitly accept, manually replace, or ignore the suggestion of replacing the entry with the selected input 318.

Alternatively, should the program find an error in the format matching process that is severe, the system "forces" the user to fix the problem. In this case, the sound feedback provided would indicate a "severe" problem, identify the problem that occurred, and, instead of suggesting input possibilities, place the cursor back into the field(s) that were just tabbed out of and need to be reentered before continuing.

Figure 4:
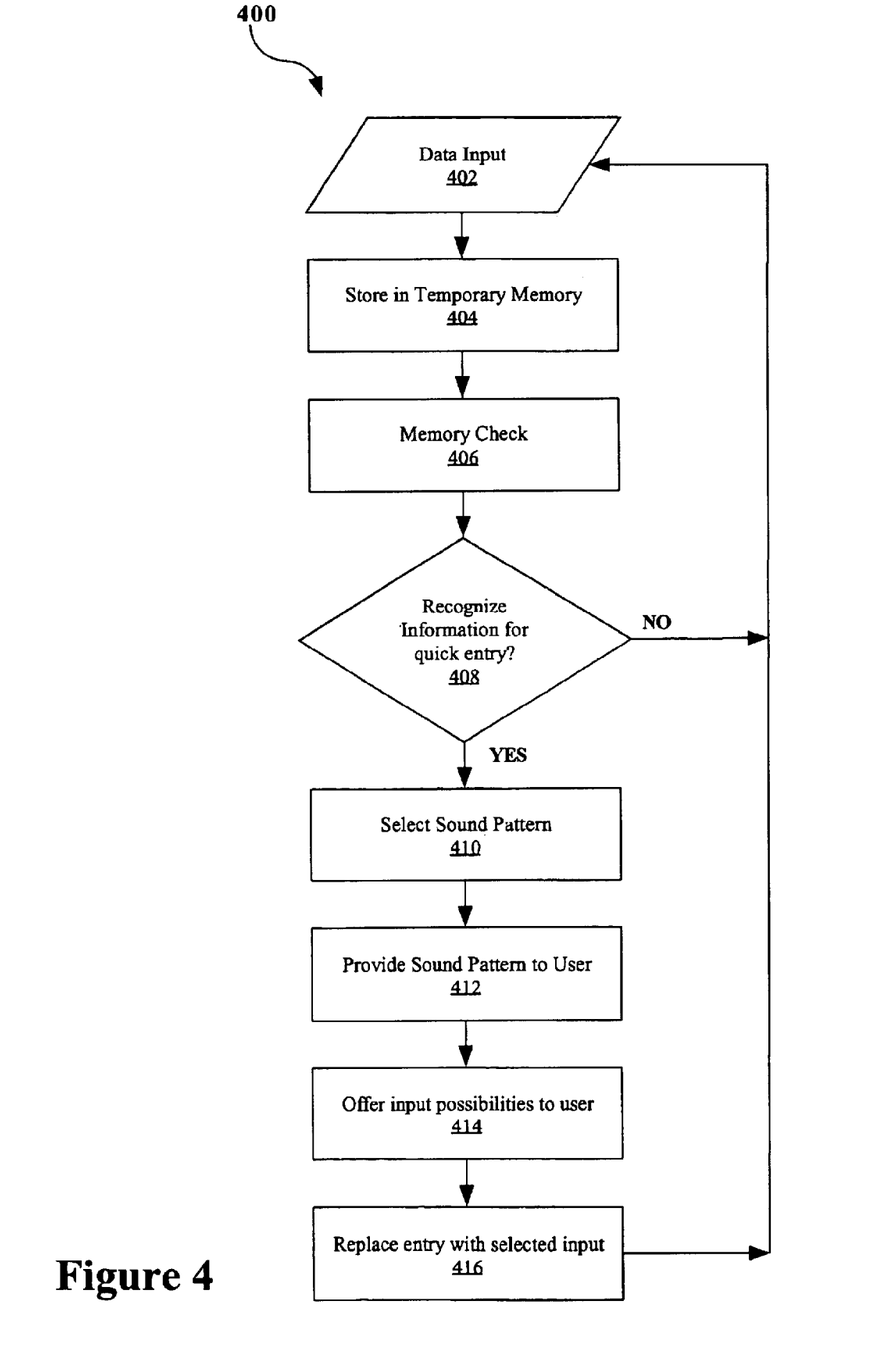
FIG. 4 illustrates a detailed flow diagram of the recognition of stored personal information.

In another instance, as shown in flow chart 400 in FIG. 4, if a user begins inputting data 402 for a standard document or form, such as an order form, report, etc. that may include a complete mailing address or telephone number, the program may recognize the stored data 404 while performing a memory check 406. If the inputted data is recognized for quick entry 408, an appropriate sound pattern 410 is selected, then provided to the user 412, and an input possibility is offered 414 (e.g. a full address and telephone number is provided). The user may accept or deny the suggestion of replacing the entry with the selected input 416. This application is also utilized for Web based forms, as described below.

Alternatively, the suggested input can be a different color, text size, font, etc. to indicate the data as retrieved from the database. The user is then approached with a second confirmation for acceptation of the provided data.

Figure 5:
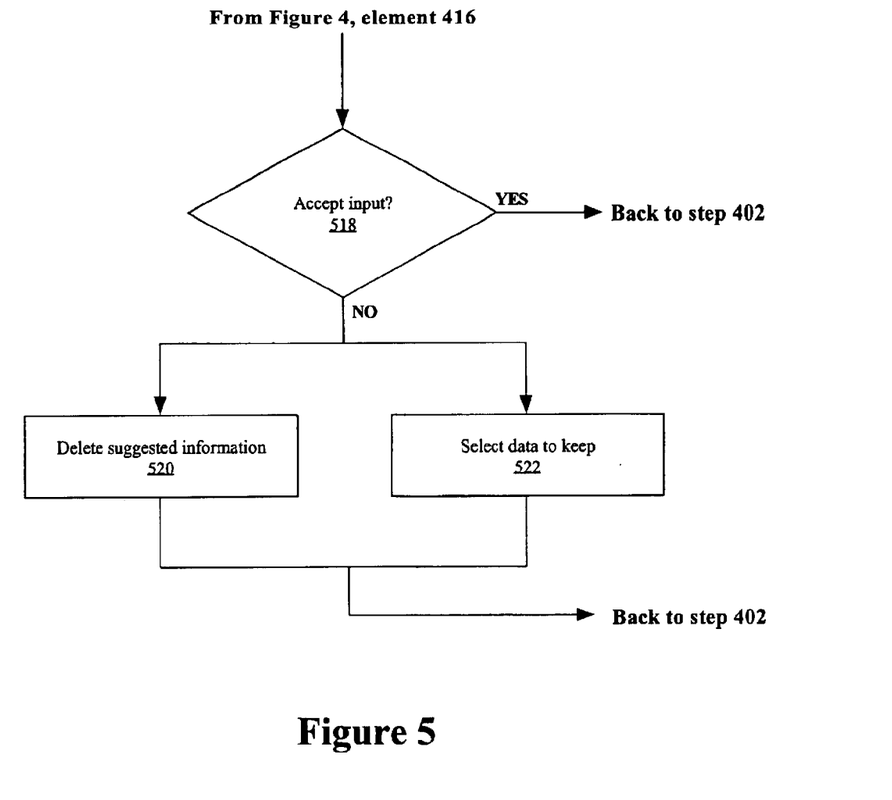
FIG. 5 illustrates an alternative flow diagram providing suggestions of stored personal information.

As an additional alternative, should the user decide not to accept the full suggested input 518, one of two options is chosen, as shown in FIG. 5. The user deletes the suggested information provided by the system and reenters the correct information 520, or selects certain entries of the suggested data to remain in the form 522 and enters the correct data in the additional fields. For example, this is useful for billing and shipping forms, should the billing address be the same, but a new shipping address need to be entered.

Figure 6:
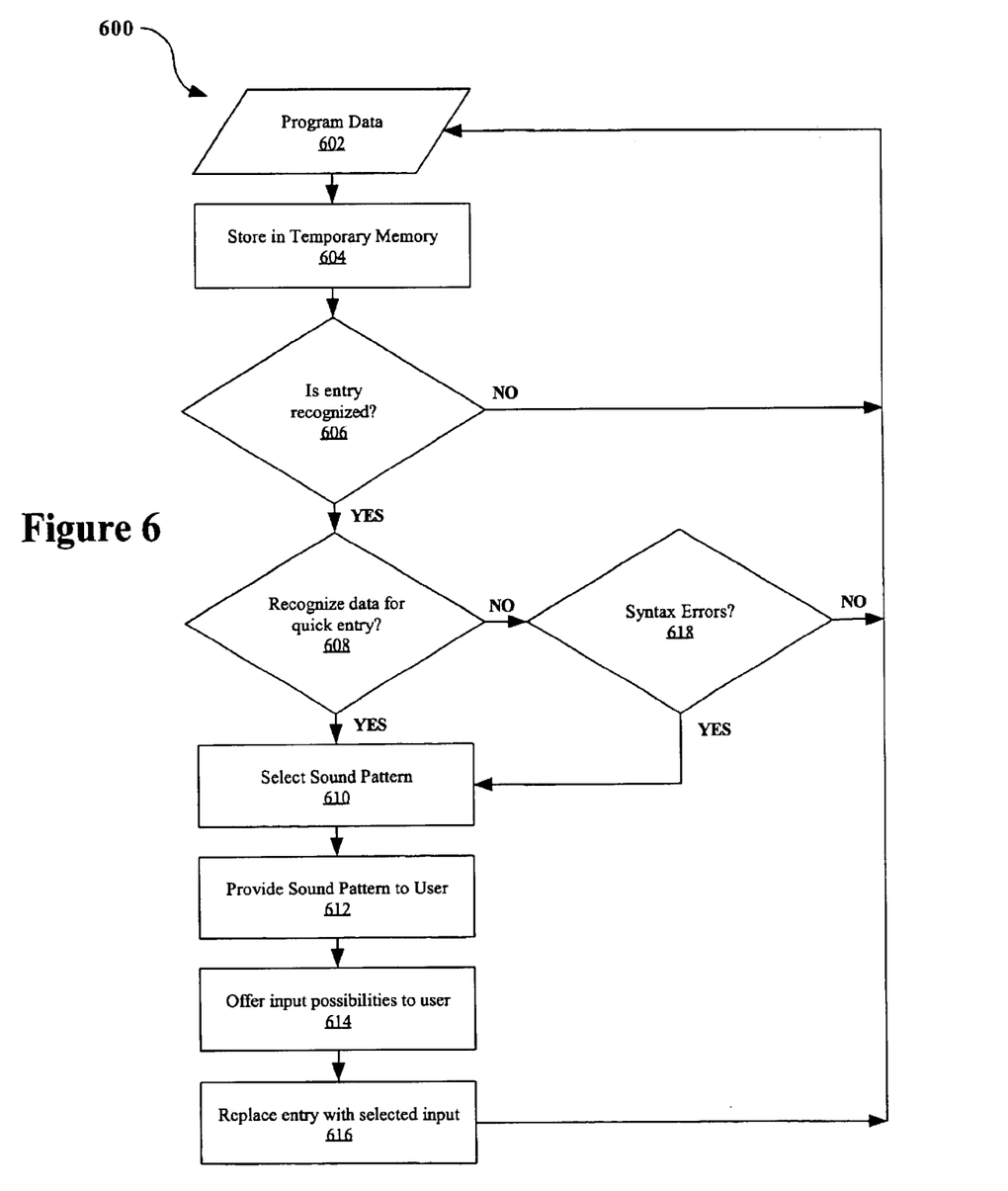
FIG. 6 illustrates a detailed flow diagram of the programming language and format correction process.

FIG. 6 illustrates an embodiment 600 of the present invention being utilized with a programming language. A user inputs program data/codes 602. As the user continues to enter the program, each word/line is checked by the program by comparing the stored input 604 to that of the program memory. The program can check for quick entry of the language terms or for a number of programming syntax mistakes, such as incorrect terms, missing parenthesis, or end terminations. If the entry is recognized 606, it is then determined whether the entry can be completed by quick entry 608. If the program can provide entry data, a sound pattern is selected 610. This sound pattern is provided to the user 612, and the recognized information can be suggested to the user 614 as a possible input. The user then opts to replace the entry with the program's selected input 616.

If the entry is recognized by the program, but it does not appear to be recognized for quick entry (step 610), the input is then checked for possible syntax errors 618. If errors appear to be present, the above steps 612–616 are repeated.

The sound feedback system described above is also useful for any type of data entry system, including form based data entry where users alternate to and from several fields, for instance, by the use of a tab key (see FIG. 4). For example, the Internet provides the ease of ordering products, such as airline/hotel reservations, through online order forms. Use of sound feedback for Internet and Web forms will assist in the avoidance of annoying errors by immediately indicating a detected pattern as the user moves through the form. Should the user input an address, for example, and "tab" to the next field without providing a zip code, a sound pattern will be immediately provided to alert the user of the mistake, rather than be presented with an error after submission of the form, and, possibly, the burden of re-entering the information.

Sound feedback for data entry programs such as online Web forms can indicate, as shown in FIG. 4, incorrect formatting of phone numbers, zip codes, etc. or incorrect date selection (for example, when arranging flight connections). Again, as previously indicated, upon recognition of data be entered, sound feedback is activated to indicate to the user that automatic entry can be activated. Should the user accept the suggestion, the system replaces the entry with the selected input.

Figure 7:
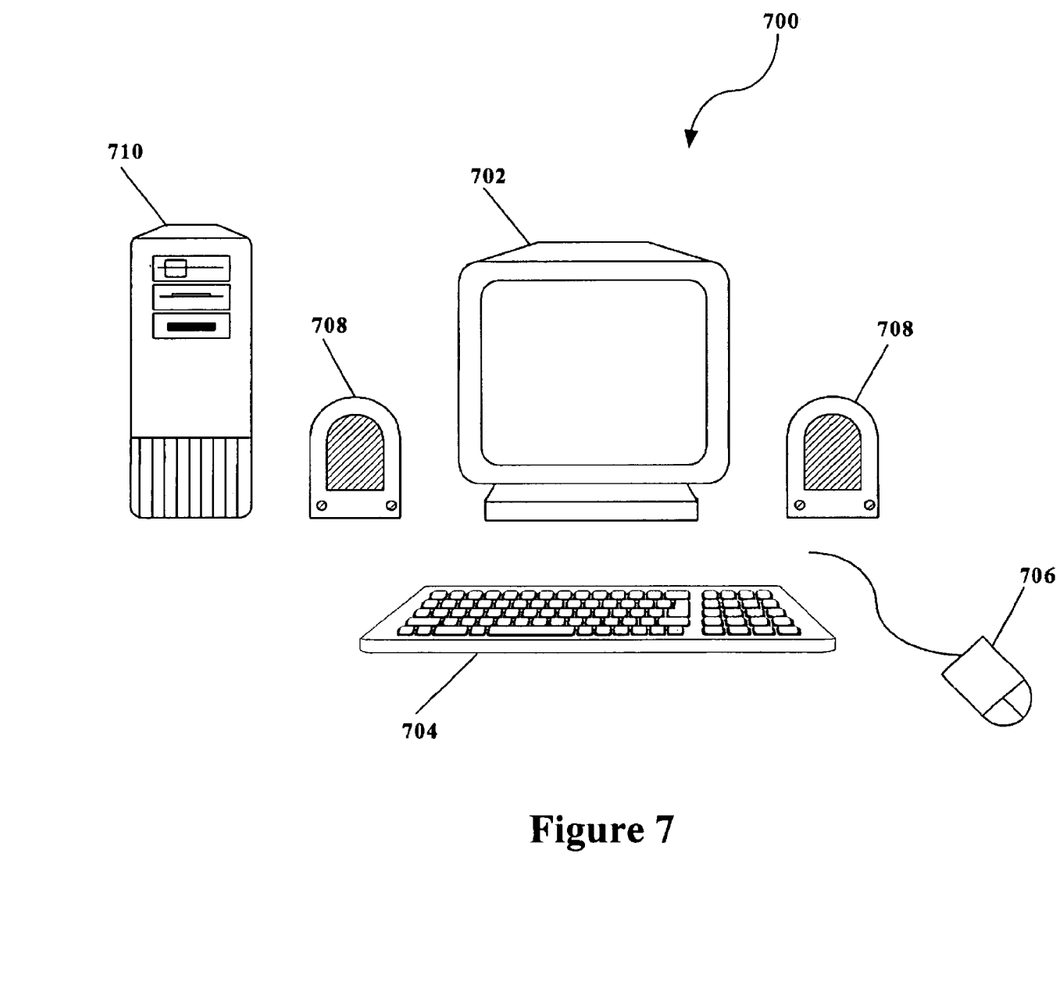
FIG. 7 illustrates a general computer-based device in which the described word processing program can be implemented.

The above enhancements for the present invention and its described functional elements are implemented in various computing environments. For example, the present invention may be implemented on a conventional IBM PC or equivalent, multi-nodal system (e.g. LAN) or networking system (e.g. Internet, WWW, wireless web). FIG. 7 illustrates a computer-based system 700 which the word processing program can be implemented. The system preferably consists of a computer display monitor 702, an input device, preferably a keyboard 704, mouse 706, and a sound source 708. System 700 also comprises memory for storing information, which is preferably, but not limited to, a personal computer's hard drive 710 (although storage may be through remote locations located across networks, such as the Internet, WWW or wireless web). All programming, GUIs, display panels and dialog box templates, and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of general computer programming and, more specifically, word-processing programming.

CONCLUSION

A system and method has been shown in the above embodiments for the effective implementation of sound pattern feedback for informational events during typing. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific sound patterns or discernible formats.

I claim:

1. A computer-based system providing selective sound patterns upon recognition of data input events, said system comprising:

computer memory storing a plurality of data inputs;

program memory retaining a plurality of prestored data inputs;

processing element correlating said data inputs to one or more of said prestored data inputs, said correlation representing an event and comprising one or more of:
a determination of a match between at least a partial data inputs to complete prestored entries, determination of errors based on an evaluation of formatting of said data input, and determination of errors based on an evaluation of multiple data inputs to rules based logic;
wherein upon recognition of a correlation, said processing element selecting a specific sound pattern representative of said event, and
a sound source reproducing said specific sound pattern.

2. A computer-based system providing selective sound patterns upon recognition of data input events, as per claim 1, wherein one or more parts of said system are located locally or connected by networks comprising any of: LANs, WANs, cellular, Internet, Web or wireless web based connections.

3. A computer-based system providing selective sound patterns upon recognition of data input events, as per claim 1, wherein said rules based logic comprises one or more of: language, formatting, syntactical and grammatical rules.

4. A computer-based system providing selective sound patterns upon recognition of data input events, as per claim 1, wherein said rules based logic comprises punctuation rules.

5. A computer-based system providing selective sound patterns upon recognition of data input events, as per claim 1, wherein said prestored data entries comprise programming language codes.

6. A computer-based system providing selective sound patterns upon recognition of data input events, as per claim 1, wherein said prestored data entries comprise any of, or a combination of, the following personal information: addresses, phone numbers, and social security numbers.

7. A computer-based system providing selective sound patterns upon recognition of data input events, as per claim 1, wherein said formatting comprises any of: URLs, e-mail addresses, or entries to a standard template or electronic form.

8. A computer-based system providing selective sound patterns upon recognition of data input events, as per claim 1, further comprising an optional corrective action suggestion to complete partial data inputs or correct data inputs with detected errors.

9. A computer-based system providing selective sound patterns upon recognition of improper formatting of data input events, said system comprising:
computer memory storing a plurality of data inputs;
program memory retaining a plurality of prestored data inputs;
processing element correlating said data inputs to one or more of said prestored data inputs, said correlation representing an event and comprising one or more of:
a determination of a match between at least a partial data inputs to complete prestored entries, determination of errors based on an evaluation of formatting of said data input, and determination of errors based on an evaluation of multiple data inputs to rules based logic;
upon recognition of a correlation, said processing element selecting a specific sound pattern representative of said event;
a sound source reproducing said specific sound pattern, and wherein said processing element provides alternative data that can be optionally selected by a user for substitution of said data input based upon said correlation.

10. A computer-based system providing selective sound patterns upon recognition of data input events, as per claim 9, wherein one or more parts of said system are located locally or connected by networks comprising any of: LANs, WANs, cellular, Internet, Web or wireless web based connections.

11. A computer-based system providing selective sound patterns upon recognition of data input events, as per claim 9, wherein said rules based logic comprises one or more of: language, formatting, syntactical and grammatical rules.

12. A computer-based system providing selective sound patterns upon recognition of data input events, as per claim 9, wherein said rules based logic comprises punctuation rules.

13. A computer-based system providing selective sound patterns upon recognition of data input events, as per claim 9, wherein said prestored data entries comprise programming language codes.

14. A computer-based system providing selective sound patterns upon recognition of data input events, as per claim 9, wherein said prestored data entries comprise any of, or a combination of, the following personal information: addresses, phone numbers, and social security numbers.

15. A computer-based system providing selective sound patterns upon recognition of data input events, as per claim 9, wherein said formatting comprises any of: URLs, e-mail addresses, or entries to a standard template or electronic form.

16. A method for notifying a computer user of specific word processing events by selected sound patterns, said method comprising the steps:
receiving word processing inputs;
storing in computer memory said received word processing inputs,
retrieving selected related word processing inputs from a library of prestored word processing inputs;
comparing said received word processing inputs with said selected word processing inputs to determine an event comprising one or more of: a match between at least a received partial inputs to complete prestored word processing inputs, errors based on an evaluation of formatting of said received inputs, or errors based on an evaluation of multiple received inputs to rules based logic,
selecting a specific sound pattern representative of said event, and
producing said selected sound pattern through a sound source.

17. A method for notifying a computer user of specific word processing events by selected sound patterns, as per claim 16, further comprising the step of suggesting possible word processing inputs to complete or correct said received word processing inputs.

18. A method for notifying a computer user of specific word processing events by selected sound patterns, as per claim 16, wherein said match between partial inputs to complete received word processing inputs is determined by recognizing any of, or a combination of, the following personal information: personal addresses, phone numbers, and social security numbers.

19. A method for notifying a computer user of specific word processing events by selected sound patterns, as per claim 16, wherein said evaluation of formatting of said received inputs further comprises the step of determining if the specific word processing events comprise e-mail addresses, URLs, or entries for a template or a standard form.

20. A method for notifying a computer user of specific word processing events by selected sound patterns, as per claim 16, wherein said sound pattern is modified to indicate the severity of a detected word processing event.

21. An article of manufacture comprising a computer program product, said computer program product comprising a computer usable medium having computer readable program code:

said computer readable program code embodying a method comprising the steps of:
receiving computer inputs,
storing in computer memory said received word processing inputs;
retrieving selected related word processing inputs from a library of prestored word processing inputs;
comparing said received word processing inputs with said selected word processing inputs to determine an event comprising one or more of: a match between received partial inputs to complete prestored word processing inputs, errors based on an evaluation of formatting of said received inputs, or errors based on an evaluation of multiple received inputs to rules based logic,
selecting a specific sound pattern representative of said event, and
producing said selected sound pattern through a sound source.

22. An article of manufacture comprising a computer program product, as per claim 21, further comprising a step comprising an optional corrective action suggestion to complete partial data inputs or correct data inputs with detected errors.

* * * * *